No. 773,503. PATENTED OCT. 25, 1904.
A. S. IRIGOYEN.
HORSE DETACHER.
APPLICATION FILED APR. 12, 1904.
NO MODEL. 2 SHEETS—SHEET 2.
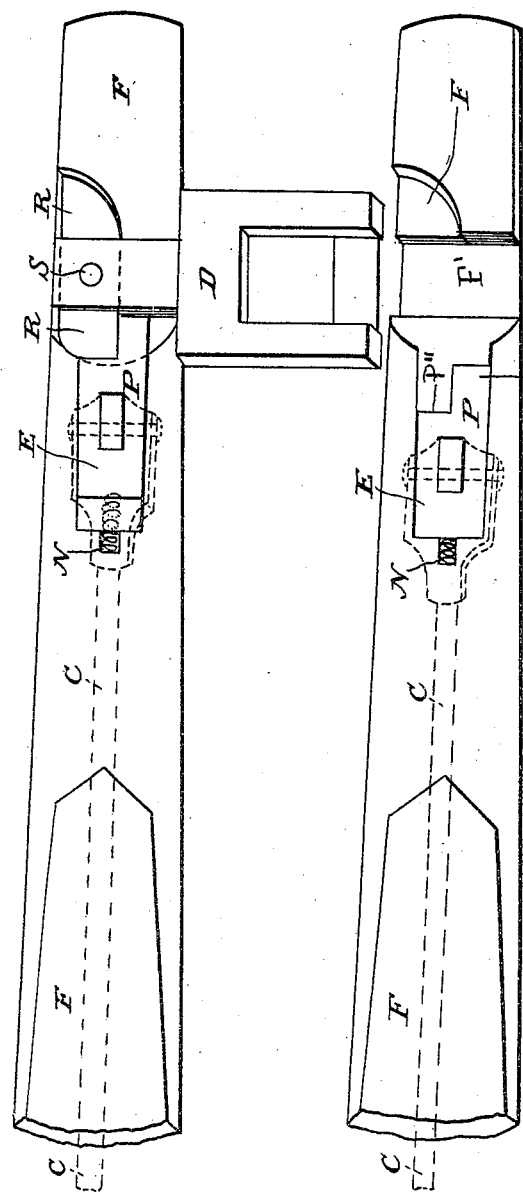
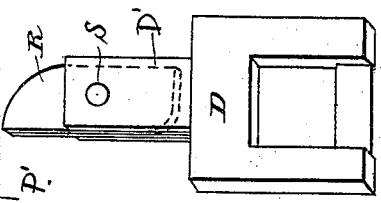
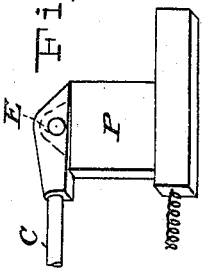
Witnesses:
Inventor:
Antonio Sanchez Irigoyen
By his Attorneys.

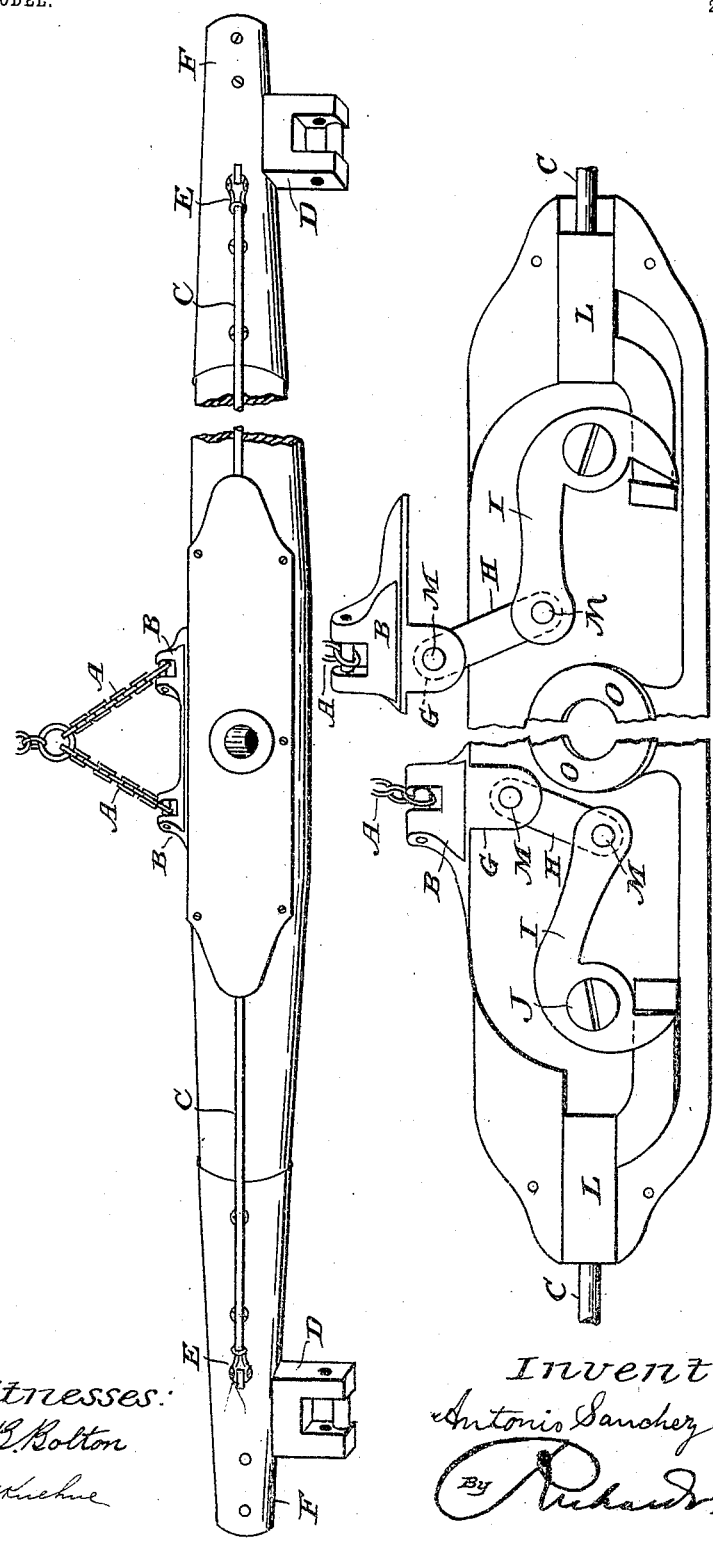

No. 773,503. Patented October 25, 1904.

UNITED STATES PATENT OFFICE.

ANTONIO SANCHEZ IRIGOYEN, OF PARRAL, MEXICO.

HORSE-DETACHER.

SPECIFICATION forming part of Letters Patent No. 773,503, dated October 25, 1904.

Application filed April 12, 1904. Serial No. 202,861. (No model.)

*To all whom it may concern:*

Be it known that I, ANTONIO SANCHEZ IRIGOYEN, manufacturer, a citizen of Mexico, residing in the city of Parral, State of Chihuahau, Republic of Mexico, have invented a Horse-Detacher, of which the following is a complete description.

My invention relates to an improved form of whiffletree carrying means for disconnecting the traces therefrom in an instant.

The invention consists of the construction, arrangement, and combination of parts hereinafter described, and particularly pointed out in the claims.

The invention is illustrated in the accompanying drawings, in which—

Figure 1 is a view of the whole device. Figs. 2 and 3 represent one-half of lever mechanism in its normal position and when the chain is pulled out, respectively. Fig. 4 is a detail. Figs. 5 and 6 represent the interior of one of the sockets F, showing the pin in engaged and disengaged position with the hook.

The tree is formed with sockets in its middle and at each end.

A represents the operating-chains for unhitching the team.

B is a plate to which the chains are connected, and this plate has projections G, which extend into the middle socket of the tree. I represents hooks pivoted at J in the said socket and which are connected to the projections G by the links H, pivoted to said projections and hooks at M M.

L represents slides engaging with the hooks I and being connected with rods C, which extend to near each end of the tree.

P represents pins sliding in each of the end sockets F, and these pins have vertical portions extending through the cover of the socket F and being connected with the rods C by pivots E. These pins have a portion cut therefrom, leaving a tongue P' and a shoulder P''.

N is a spiral spring inserted between the back of pin P and the rear wall of socket F, so as to keep the pin in its forward position.

D indicates the hooks to which the traces of the harness are attached. These hooks have a portion D', which is adapted to enter grooves F', forming part of the socket F. The portion D' carries a lever R, pivoted at S. This lever has one corner square, so as to fit the cut-out portion of the pin, and at its other end it is rounded, so as to fit a correspondingly-shaped portion of the socket F, as shown in Fig. 5.

O is the opening for the bolt which unites the tree to the vehicle.

When the hooks are to be attached to the tree, the chains A are drawn upon, so as to pull plate B away from the tree. (See Fig. 3.) Thus hooks I are turned on their pivots and draw slides L toward each other and through the rods C pins P are drawn inwardly, so as to compress springs N, as shown in Fig. 6. The hooks D are then inserted in their grooves and the levers R turned on their pivots, and then the pins P are allowed to slide forward under the action of their springs, so that the square corner of the lever will engage the cut-away portion of the same, the rounded end engaging with the rounded recess, as shown in Fig. 5. When it is desired to unhitch the team from the vehicle, it is only necessary to draw on chains A, so that through the described connections the pins P will slide back and the strain of the horse pulling on the traces will tend to draw the hooks out of their grooves. The rounded end of the lever R coming against the wall of the socket will cause said lever to swing on its pivot until it reaches the position shown in Fig. 6, when it can freely pass through the groove, and thus the hooks will be free from the tree.

I claim as my invention—

1. A whiffletree for vehicles having sockets at each end thereof, hooks fitting in said sockets, pins detachably engaging said hooks, a movable plate B, connections from said plate to the pins and means for moving the plate to disengage the pins from the hooks.

2. A whiffletree having sockets at each end, hooks fitting in said sockets, levers pivoted to the inner ends of said hooks, pins adapted to engage with said levers and means for disengaging the pins from said levers.

3. A whiffletree having sockets formed at each end thereof, hooks adapted to fit therein levers pivoted in their centers to said hooks one end of said levers engaging with the wall of the sockets, pins for engaging with the other end of the levers and means for disengaging the pins therefrom for releasing the hooks from the tree.

In witness whereof I have hereunto set my hand in presence of two witnesses.

ANTONIO SANCHEZ IRIGOYEN.

Witnesses:
FREDERICK GRIESE,
J. J. WOODWORTH.